United States Patent
Yorimitsu

(10) Patent No.: US 8,151,167 B2
(45) Date of Patent: Apr. 3, 2012

(54) PROGRAM PROCESSING DEVICE AND PROGRAM PROCESSING METHOD

(75) Inventor: Keiichi Yorimitsu, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 711 days.

(21) Appl. No.: 12/362,990

(22) Filed: Jan. 30, 2009

(65) Prior Publication Data
US 2009/0199049 A1   Aug. 6, 2009

(30) Foreign Application Priority Data
Feb. 1, 2008   (JP) ................................ 2008-022995

(51) Int. Cl.
*G11C 29/00* (2006.01)
(52) U.S. Cl. ...................................................... 714/764
(58) Field of Classification Search .................... 714/764
See application file for complete search history.

(56) References Cited

U.S. PATENT DOCUMENTS
2006/0047374 A1   3/2006   Hashimoto et al.

FOREIGN PATENT DOCUMENTS
| JP | 2000-059981 | 2/2000 |
|---|---|---|
| JP | 2000-132461 | 5/2000 |
| JP | 2005-208958 | 8/2005 |
| JP | 2006-072461 | 3/2006 |

*Primary Examiner* — Sam Rizk
(74) *Attorney, Agent, or Firm* — Staas & Halsey LLP

(57) ABSTRACT

A program processing device has a non-volatile storage, a volatile storage and a controller. The controller has a detector that detects a bit flip in the program, the variable data, and the constant data in the volatile storage, a constant recovery unit that, when the detector detects an error in the constant data, writes the constant data in the non-volatile storage into the volatile storage, and then continues the execution of the program from a point at which the program was being executed before the detector detected the error, and a restart that, when the detector detects an error in one of the variable data and the program, writes the program, the initial value of the variable data, and the constant data in the non-volatile storage into the volatile storage, and then executes the program written into the volatile storage from a beginning of the program.

15 Claims, 15 Drawing Sheets

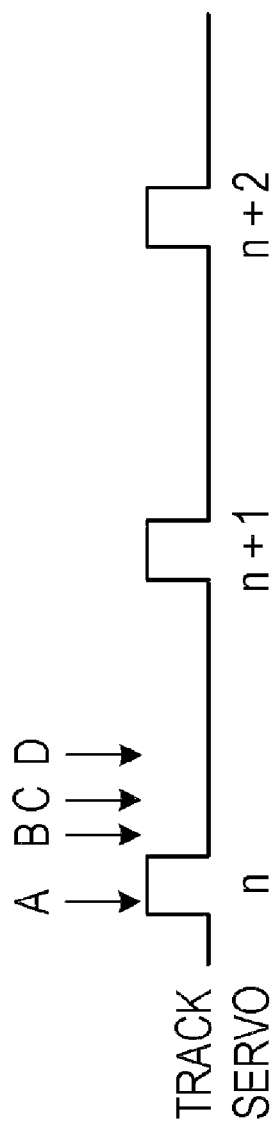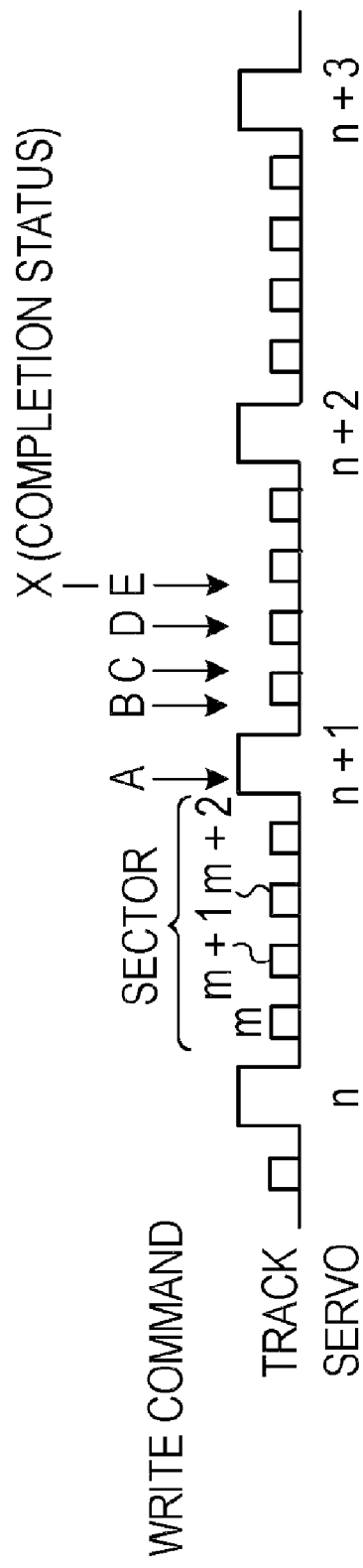

PROGRAM PROCESSING DEVICE AND PROGRAM PROCESSING METHOD

CROSS-REFERENCE TO RELATED APPLICATIONS

This application is based upon and claims the benefit of priority from the prior Japanese Patent Application No. 2008-22995 filed on Feb. 1, 2008, the entire contents of which are incorporated herein by reference.

BACKGROUND

1. Field

The application describes control of execution of a program.

High-functional-complexity devices, such as a controller for executing a program in which the controller controls each unit in the devices, have been widely available. The controller of the devices reads a program stored in a memory and executes the program to control each unit in the devices. Further, in accordance with the execution of the program, the controller reads various data from the memory or writes data into the memory as necessary.

For example, a magnetic disk device for recording or reading information onto or from a magnetic disk in response to a request from a host computer includes a built-in controller formed of a processor. The controller executes a program stored in the memory to control a spindle motor of a magnetic disk or a motor of a carriage arm having a head in accordance with a request command sent from the host computer to store data on the magnetic disk or read stored data. Examples of storage devices which store a program executed by a processor and data include volatile semiconductor memories such as a static random access memory (SRAM) and a dynamic random access memory (DRAM). Volatile semiconductor memories provide high-speed reading and writing; however, the contents stored are lost when power is turned off. Thus, in general, a program and data are stored in a low-speed non-volatile storage device or semiconductor memory such as a flash memory or a disk medium, and are loaded onto a volatile semiconductor memory at the power-on time and executed.

With the development of fine processing technologies of semiconductor memories, the degree of integration of memory cells has increased; however, a bit flip caused by a soft error is prone to occur. A soft error stands for a change in the state of data held in memory cells ("1" or "0"), which is caused by the impact of cosmic rays (alpha rays) against a semiconductor memory. The cosmic rays may have reached the earth from outer space through the Earth's atmosphere. For example, a DRAM holds binary bit information as an amount of electric charge accumulated in a memory cell. Thus, if the energy imparted by the impact of cosmic rays causes the amount of electric charge to change, the information is lost. The size of the memory cells decreases as the degree of integration increases, and the number of bits affected by a single cosmic ray impact also increases.

Changes in programs written in SRAMs or DRAMs or data required for the program operations due to bit flips may cause devices to be unable to exhibit the desired performance, and may also cause malfunctions or damage. For example, when a controller operates without control in a magnetic disk device, desired information may not be recorded on a magnetic disk. Additionally, correctly recorded data may be broken, or a magnetic disk may be damaged so as to be in a reading-disabled state.

One countermeasure against bit flips in volatile semiconductor memories is to use error correction code (ECC) memories having an error correction function. However, ECC memories have problems of having a limited number of bits that can be correctly corrected for errors. ECC memories also have high cost because of a built-in high-complexity error correction circuit, and low reading and writing speed because of the access delay caused by the error correction circuit.

Another countermeasure against bit flips is the multiple use of parity-enabled memory space. That is, a parity-enabled memory is used as a volatile memory, and a program and data are written into two locations of a parity-enabled memory or into two parity-enabled memories. If a parity error is detected when the program is read from one of the memories, the program can be read from the other memory. However, the multiple use of memory space can reduce the memory use efficiency, resulting in an increase in cost.

Accordingly, techniques for detecting only a bit flip without using a memory in multiple ways or without performing error correction have been proposed. For example, a technique has been proposed in which the parity or checksum of a program or data is checked for each predetermined number of blocks. A block in which an abnormal state is detected is overwritten with the original in a read-only memory (ROM) or flash memory (see, for example, Japanese Unexamined Patent Application Publication Nos. 2000-132461, 2005-208958, and 2006-72461).

In this technique, however, in a case where a program or data has already been used by a processor before a parity or checksum error is detected, mere overwriting of the program would not be sufficient to recover the processor from the abnormal operation state, and the abnormal operation state may lead to another abnormal operation state. If the device itself is reset every time an error in the stored contents is detected, on the other hand, the overall operation speed is reduced and the device may fail to respond within a required period of time.

SUMMARY

In view of the foregoing situation, an embodiment described herein provides a device which can mitigate reduction in operation speed while preventing abnormal control, which is critical to the device, without using a special correction circuit for bit flips.

According to the embodiment, a program processing device has a non-volatile storage that stores a program, an initial value of variable data and constant data, a volatile storage and a controller that writes the program, the initial value and the constant data into the volatile storage and executes the program, wherein the controller has a detector that detects a bit flip in the program, the variable data, and the constant data in the volatile storage, a constant recovery unit that, when the detector detects an error in the constant data, writes the constant data in the non-volatile storage into the volatile storage, and then continues the execution of the program from a point at which the program was being executed before the detector detected the error, and a restart that, when the detector detects an error in one of the variable data and the program, writes the program, the initial value of the variable data, and the constant data in the non-volatile storage into the volatile storage, and then executes the program written into the volatile storage from a beginning of the program.

The above-described embodiments of the present invention are intended as examples, and all embodiments of the present invention are not limited to including the features described above.

BRIEF DESCRIPTION OF THE DRAWINGS

FIG. 5 is a diagram showing a timing at which a servo region is detected when a magnetic head is moving along a track.

FIG. 6 is a diagram showing a timing at which a servo region is detected in a recording command.

DETAILED DESCRIPTION OF THE PREFERRED EMBODIMENTS

Figure 1:
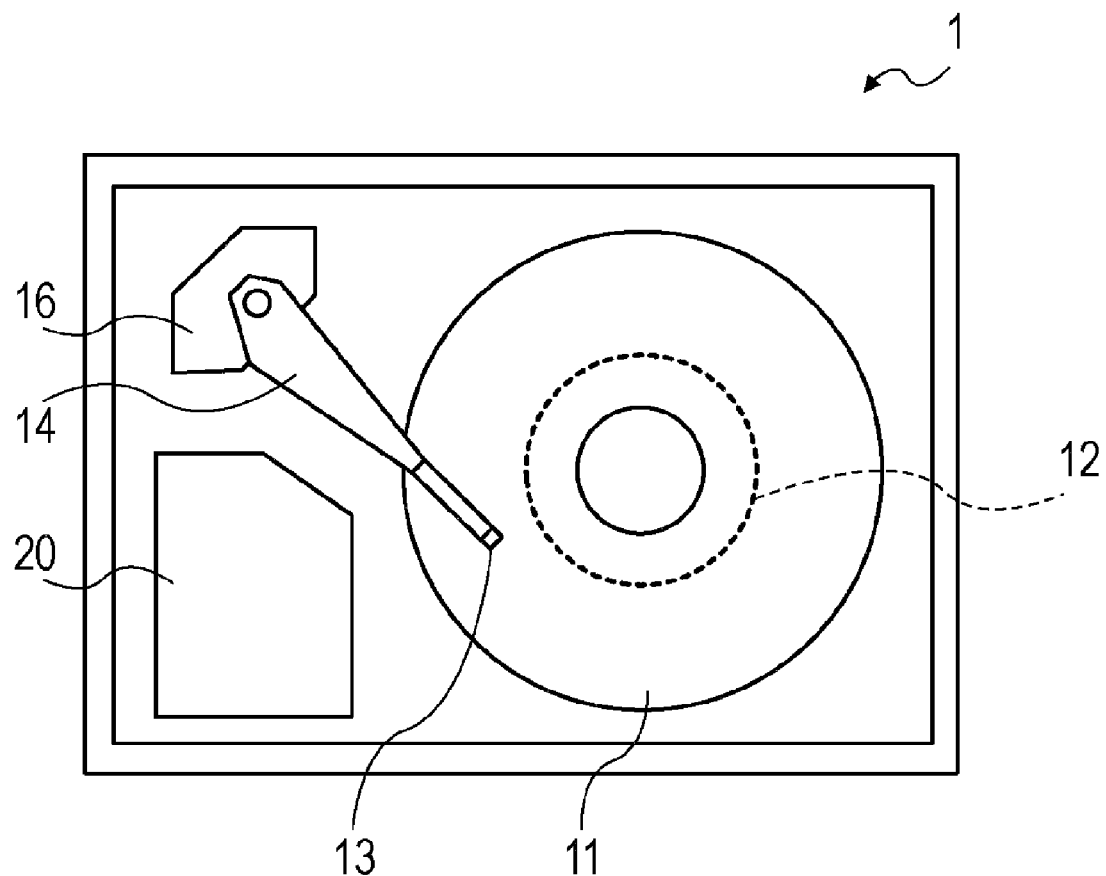
FIG. 1 is a diagram showing the internal structure of a hard disk device (HDD) which is a specific first embodiment of a device.

Reference may now be made in detail to embodiments of the present invention, examples of which are illustrated in the accompanying drawings, wherein like reference numerals refer to like elements throughout.

Specific embodiments will be described hereinafter with reference to the drawings.

FIG. 1 is a diagram showing the internal structure of a hard disk device (HDD) 1 according to a first embodiment.

Referring to FIG. 1, the HDD 1 includes a disc-shaped magnetic disk 11 on which information is recorded, a spindle motor (SPM) 12 that drives the magnetic disk 11 to rotate, a magnetic head 13 that writes and reads information into and from the magnetic disk 11, a carriage arm 14 having the magnetic head 13 mounted at a leading end thereof and arranged to swing along the magnetic disk 11, a voice coil motor (VCM) 16 serving as a drive unit that drives the carriage arm 14, and a control circuit 20 that controls the overall operation of the HDD 1.

In the HDD 1, information is recorded on the magnetic disk 11 and information recorded on the magnetic disk 11 is reproduced. In the recording and reproduction of information, first, the control circuit 20 controls the spindle motor 12 to drive the magnetic disk 11 and the voice coil motor 16 to drive the carriage arm 14. The magnetic disk 11 has a plurality of tracks concentrically arranged thereon, and the tracks are regions on which information is recorded.

Each of the tracks is sectioned by a plurality of servo regions. A plurality of sectors are further arranged between the servo regions, each of which may be a unit of writing and reading of information. A servo number for identifying a track and a servo is recorded in each servo region. If the magnetic head 13 is positioned at a desired track on the magnetic disk 11 under the control of the control circuit 20, in accordance with the rotation of the magnetic disk 11, the magnetic head 13 sequentially approaches the sectors arranged along each track of the magnetic disk 11.

During the recording of information, an electric recording signal is input to the magnetic head 13 which has approached the magnetic disk 11. The magnetic head 13 applies a magnetic field to the sectors in accordance with the input recording signal. The magnetic head 13 records information carried on the recording signal using a format corresponding to the direction of magnetization of the sectors. During the reproduction of information, the magnetic head 13 extracts the information recorded using the format corresponding to the direction of magnetization of the sectors by generating an electric reproduction signal in accordance with a magnetic field produced from each of the magnetized sectors.

Here, the magnetic disk 11 may correspond to an example of the information storage medium unit in the applied mode described above. Each of the spindle motor 12, the magnetic head 13, and the voice coil motor 16 may correspond to an example of the information recording unit in the applied mode described above.

Figure 2:
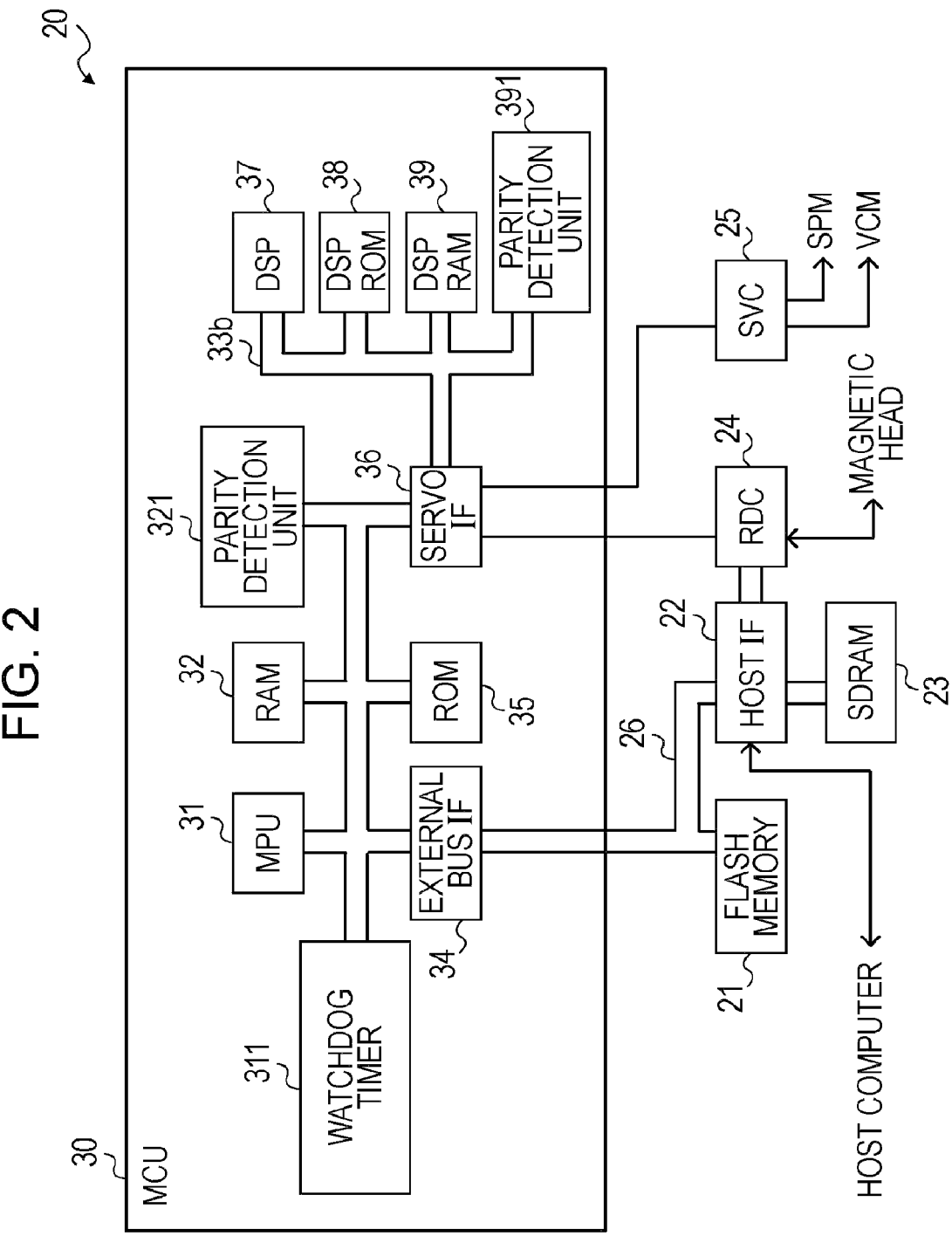
FIG. 2 is a block diagram showing the structure of a control circuit of the hard disk device shown in FIG. 1.

FIG. 2 is a block diagram showing the structure of the control circuit 20 of the HDD 1 shown in FIG. 1.

Referring to FIG. 2, the control circuit 20 includes a microcontroller unit (MCU) 30 in which a processor that executes an instruction and peripheral functions are integrated into a single chip, a flash memory 21 on which an instruction and data are stored, a host interface (host IF) 22 that exchanges information with an external host computer, a read channel controller (RDC) 24 that exchanges a recording signal which represents information with the magnetic head 13 (see FIG. 1), and a spindle VCM controller (SVC) 25 that outputs a control signal to the spindle motor (SPM) 12 and the voice coil motor (VCM) 16. The MCU 30, the flash memory 21, the host IF 22, the flash memory 21, the RDC 24, and the SVC 25 are connected to one another via an external bus 26.

The MCU 30 includes a micro-processing unit (MPU) 31 that executes an instruction; a RAM 32 into which the instruction executed by the MPU 31 is written; a parity detector 321 that detects a parity error of a value read from the RAM 32; an external bus IF 34 that intermediates between an MPU bus 33a in the MCU 30 and the external bus 26; a ROM 35 on which an initialization instruction for the MCU 30 is stored; a servo IF 36 that intermediates between the MCU 30 and each unit performing a servo function; a DSP 37 that executes an instruction to achieve a servo function; a DSP ROM 38 on which an initialization instruction for the DSP 37 is stored; a DSP RAM 39 on which an instruction for causing the DSP 37 to achieve a servo function is stored; a parity detector 391 that detects a parity error of a value read from the DSP RAM 39; and a watchdog timer 311 for monitoring the operation of the MPU 31.

The MPU 31, the RAM 32, the ROM 35, the servo IF 36, and the watchdog timer 311 are connected to one another via the MPU bus 33a. The MPU 31 executes the instructions stored in the RAM 32 and the ROM 35. Further, the MPU 31 can provide writing and reading of data to and from the flash memory 21, the host IF 22, and a synchronous DRAM (SDRAM) 23 via the external bus IF 34. The RAM 32 is formed of a parity-enabled SRAM. The ROM 35 is a mask ROM on which an initialization instruction for the MPU 31 is stored. The watchdog timer 311 performs time counting to measure a predetermined period of time, and generates an initialization request interrupt for the MPU 31 when the predetermined period of time has elapsed.

In response to the initialization request interrupt, the MPU 31 executes an instruction for initializing the ROM 35. When the MPU 31 writes a counter value representing a given period of time, the watchdog timer 311 is reset. The MCU 30 further includes, in addition to the units described above, a circuit that executes a special arithmetic operation using a wired logic circuit to assist the processing of the MPU 31. The MCU 30 further includes a circuit that processes signals input to and output from a general-purpose input/output (IO) port, which will not be described in detail or shown in the Figures.

The DSP 37, the DSP ROM 38, and the DSP RAM 39 are connected to one another via a DSP bus 33b. The DSP 37 receives a servo command from the MPU 31 via the servo IF 36, and sends a result of execution of the servo command to the MPU 31. The DSP 37 can further access the flash memory 21 via the external bus IF 34.

The flash memory 21 is a non-volatile memory on which firmware of the MPU 31 and the DSP 37 is stored. The firmware includes an instruction and a table to be referred to during the execution of the instruction. The flash memory 21 is a low-speed device which is accessed for a relatively long time. Thus, during the initialization operation after power is turned on, the instruction and the table are read from the flash memory 21 and are written into the RAM 32 and the DSP RAM 39 which are high-speed devices. The MPU 31 and the DSP 37 read and execute a copy of the instruction written in the RAM 32 and the DSP RAM 39. The contents of the instruction and the details of the execution of the instruction will be described below.

The ROM 35 stores an initialization instruction which is executed by the MPU 31 immediately after power is turned on and immediately after restart. The MPU 31 reads and executes the initialization instruction to initialize each unit in the MCU 30. The MPU 31 further reads an instruction from the flash memory 21 and writes it into the RAM 32 so that the control is moved to the instruction written in the RAM 32. The RAM 32 also stores a parity code along with the instruction. The parity detector 321 generates a parity code when the MPU 31 performs writing to the RAM 32, and checks the parity of a read value when the MPU 31 performs reading from the RAM 32. Upon detection of a parity error, the parity detector 321 sets a detection flag which means an error, and stores an address at which the parity error is detected in a built-in error address register. The detection flag and the error address register are accessible by the MPU 31.

Like the ROM 35, the DSP ROM 38 is also a mask ROM that stores an initialization instruction which is executed by the DSP 38 immediately after power is turned on and immediately after restart. The DSP 38 reads and executes the initialization instruction in the DSP ROM 38 to initialize each peripheral unit. The DSP 38 further reads an instruction from the flash memory 21 and writes it into the DSP RAM 39 so that the control is moved to the instruction written in the DSP RAM 39.

The parity detector 391 generates a parity code when the DSP 37 performs writing to the DSP RAM 39, and checks the parity of a read value when the DSP 37 performs reading from the DSP RAM 39. The parity detector 391 sets a detection flag indicating an error upon detection of a parity error. The parity detector 391 stores an address at which the parity error is detected in a built-in error address register. The detection flag and the error address register are accessible by the DSP 37.

The host IF 22 receives an information write and read command from the external host computer, and sends the command to the MPU 31. The host computer sends a sector-by-sector write and read instruction. During the reading of information, the RDC 24 performs a conversion process on information read by the magnetic head 13 (see FIG. 1), and sends the processed information to the host IF 22. The host IF 22 temporarily accumulates the information received from the RDC 24 into the SDRAM 23, and then sends the information to the host computer. During the writing of information, the host IF 22 sends information supplied from the host computer to the RDC 24, and the RDC 24 supplies the information to the magnetic head 13.

The servo IF 36, the DSP 37, the DSP ROM 38, the DSP RAM 39, and the SVC 25 provide servo functions to the MPU 31. Upon receipt of information regarding the position of a track and a servo region where a desired sector is arranged from the MPU 31, the DSP 37, which executes an instruction written in the DSP RAM 39, compares the received information to servo information read from the magnetic head 13 via the RDC 24. The DSP 37 sends a control signal to the SVC 25 to control the operation of the SPM 12 and the VCM 16 so that the magnetic head 13 moves to the position of the desired track and follows the track.

When the servo information read from the magnetic head 13 matches the servo information regarding the desired servo and an on-track state is obtained, the DSP 37 notifies the MPU 31 of normal servo termination. After the on-track state has been obtained, information is recorded on or read from the target sector by the host IF 22 and the RDC 24. The DSP 37 also checks a servo region arranged after the sector on which the information has been recorded, and confirms that the information has been stored in the correct sector.

Here, each of a combination of the MPU 31 and the ROM 35 and a combination of the DSP 37 and the DSP ROM 38 may correspond to an example of the controller in the basic mode described above. The ROM 35 may correspond to an example of the non-volatile storage in the basic mode described above. Each of the RAM 32 and the DSP RAM 39 may correspond to an example of the volatile storage in the basic mode described above.

The contents of the instruction and the execution of the instruction will now be described.

Figure 3:
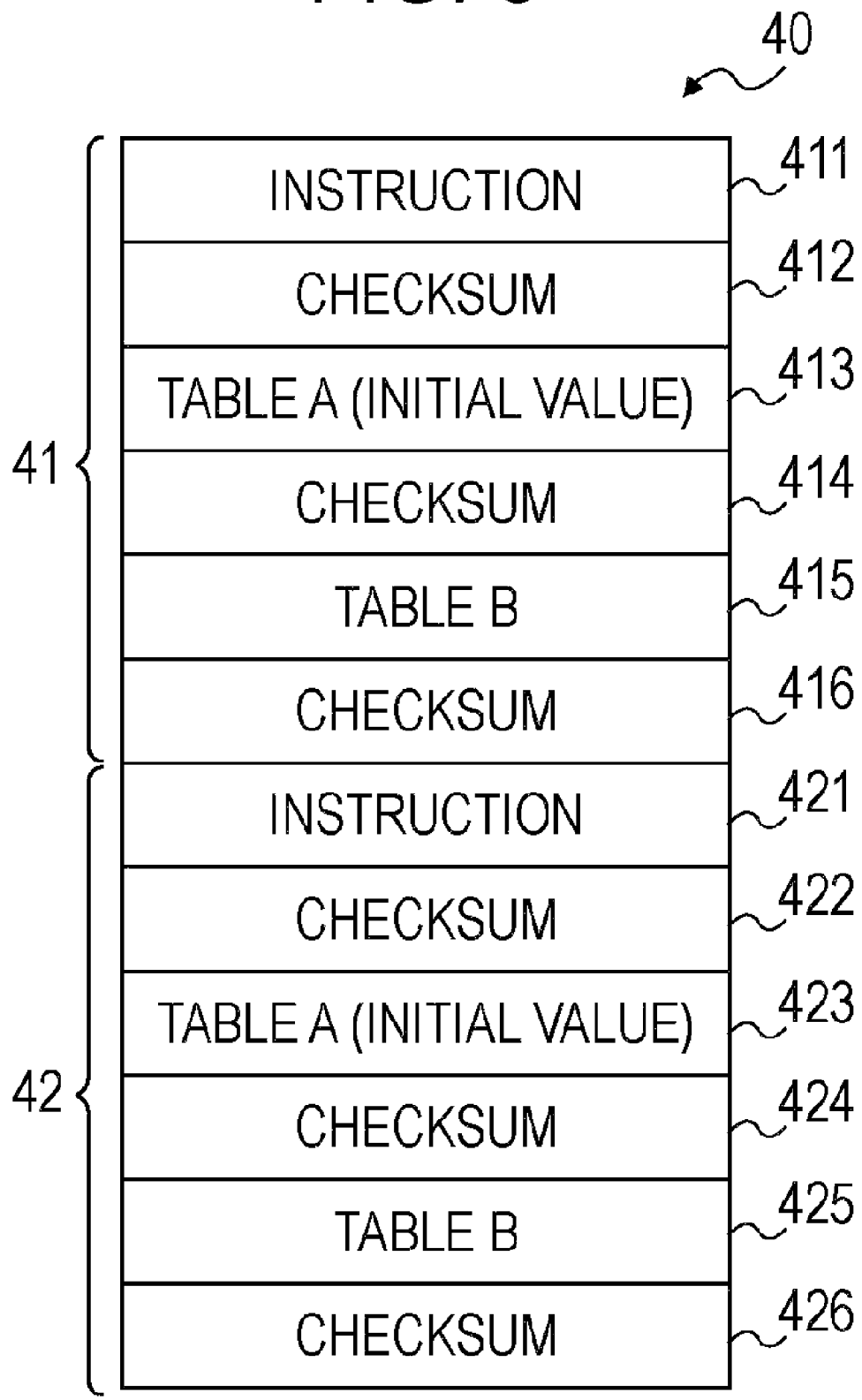
FIG. 3 is a diagram showing the configuration of firmware stored in a flash memory shown in FIG. 2.

FIG. 3 is a diagram showing the configuration of the firmware stored in the flash memory 21 shown in FIG. 2.

The flash memory 21 stores command process firmware 41 executed by the MPU 31 and servo process firmware 42 executed by the DSP 37. The firmware includes an instruction executed by a processor and a table to be referred to or written by the processor that executes the instruction.

The command process firmware 41 includes an instruction 411 executed by the MPU 31, and the initial value of a table A 413 and a table B 415 which are referred to by the MPU 31 to execute the instruction 411. The table A 413 includes an IOP table for setting the IO port of the MCU 30, a cache table for temporarily saving data, and an address conversion table used for an address conversion process. The table A 413 is a table whose value is rewritten in accordance with the execution of the instruction 411 and is required to correctly execute the instruction 411. The initial value of the table A 413 stored in the flash memory 21 is a value that is initially set when the execution of the instruction 411 starts. The value of the table B 415 is constant regardless of the execution of an instruction. The command process firmware 41 further includes checksums 412, 414, and 416 corresponding to the instruction 411, the table A 413, and the table B 415, respectively. More specifically, the checksums 412, 414, and 416 include values corresponding to blocks into which the instruction 411, the table A 413, and the table B 415 are divided by a predetermined number of words, respectively.

The MPU 31 and the DSP 37 have different processor-executable instruction sets, and have different functions. Therefore, the contents of the command process firmware 41 are different from the contents of the servo process firmware 42. However, the servo process firmware 42 has a similar structure to the command process firmware 41. Specifically, the servo process firmware 42 includes an instruction 421 executed by the DSP 37, a table A 423 and a table B 425 which are referred to by the DSP 37 to execute the instruction 421, and checksums 422, 424, and 426 corresponding to the instruction 421, the table A 423, and the table B 425, respectively.

Here, each of the instructions 411 and 421 may correspond to an example of the program in the basic mode described above. Each of the table A 413 and the table A 423 may correspond to an example of the variable data in the basic mode described above. Each of the table B 415 and the table B 425 may correspond to an example of the constant data in the basic mode described above.

After power is turned on and after restart, the MPU 31 executes the initialization instruction stored in the ROM 35 to read the command process firmware 41 stored in the flash memory 21. The MPU 31 writes a copy of the entirety of the command process firmware 41 into both the RAM 32 and the SDRAM 23. When the copy is written into the RAM 32, a parity code which is generated per word by the parity detector 321 is also stored in the RAM 32. After the writing of the copy has been completed, the MPU 31 which was executing the initialization program starts the execution of the instruction 411 of the command process firmware 41 written in the RAM 32. The table A 413 written in the RAM 32 is rewritten and changed in accordance with the execution of the instruction 411. The copy written in the SDRAM 23 may be used as backup data of the RAM 32.

Figure 4:
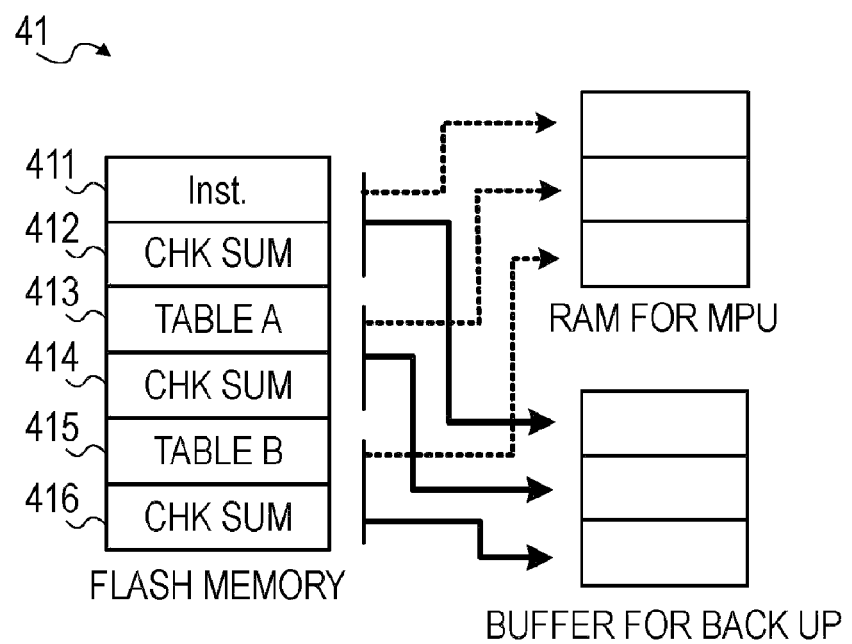
FIG. 4 is a diagram showing a manner in which a copy of command process firmware stored in the flash memory is written into a RAM and an SDRAM.

FIG. 4 is a diagram showing a manner in which a copy of the command process firmware 41 stored in the flash memory 21 is written into the RAM 32 and as the SDRAM 23.

A copy of the instruction 411, table A (initial value) 413, table B 415, and checksums 412, 414, and 416 included in the command process firmware 41 stored in the flash memory 21 is written into both the RAM 32 and the SDRAM 23.

As with the MPU 31, after power is turned on (Power On) and after restart (Reboot), the DSP 37 executes the initialization program stored in the DSP ROM 38 to read the servo process firmware 42 stored in the flash memory 21. The DSP 37 writes a copy of the entirety of the servo process firmware 42 into both the DSP RAM 39 and the SDRAM 23. When the copy is written into the DSP RAM 39, a parity code which is generated per word by the parity detector 391 is also stored in the DSP RAM 39. After the writing of the copy has been completed, the DSP 37 which was executing the initialization program starts the execution of the instruction 421 in the servo process firmware 42 written in the DSP RAM 39. The copy written in the SDRAM 23 is used as backup data of the DSP RAM 39. In the following description, instructions, tables A, and tables B written in the RAM 32 and the SDRAM 23 are assigned the same reference numerals as those stored in the flash memory 21 and the description will be continued.

Next, an overview of the operation of the control circuit 20 will be described. The MPU 31 which executes the command process firmware 41 receives a command for recording (Write) or reading (Read) information onto or from a specific sector from the external host computer via the host IF 22, and specifies a track and servo region corresponding to the specified sector. The MPU 31 further performs a recording or reading setting on the host IF 22 and the RDC 24 with respect to a target sector subsequent to the desired servo region. When the MPU 31 specifies a desired track and servo region, the DSP 37 which executes the servo process firmware 42 reads the servo number of the servo region from the magnetic head 13 via the RDC 24. The DSP 37 further controls the SVC 25 to drive the VCM 16 so that the magnetic head 13 moves onto the specified track. When the magnetic head 13 is moved onto the specified track, the servo number of the specified servo region is read from the magnetic head 13. In this manner, the DSP 37 detects a state where the magnetic head 13 is located on the specified track, that is, the on-track state, and notifies the MPU 31 of the on-track state. Further, the host IF 22 and the RDC 24 perform a recording or reading operation on the desired sector subsequent to the servo region.

FIG. 5 is a diagram showing a timing at which a servo region is detected when the magnetic head is moving along a track.

When the magnetic head 13 is moving along a track, a plurality of servo regions n, n+1, n+2, etc., arranged on the track pass through the magnetic head 13. Here, the description will be given in the context in which the servo region n is a desired servo region. When the servo region n passes through the magnetic head 13, the DSP 37 detects the passing of the servo region (timing A of FIG. 5). Thereafter, the DSP 37 obtains the servo number n of the servo region, and checks whether or not the servo number n matches the number of the servo region specified by the MPU 31. If the numbers match, the DSP 37 sends an on-track state notification together with the servo number to the MPU 31 (timing B).

After the servo region, the desired sector passes through the magnetic head 13. In response to the notification from the DSP 37, an interrupt occurs in the MPU 31 (timing C). In the interrupt process, the MPU 31 checks whether or not the servo number sent from the DSP 37 matches the servo number specified by the MPU 31. If it is determined that the servo numbers match, a flag indicating the on-track state is set and the interrupt process ends. The MPU 31 which has been recovered from the interrupt process checks the flag in the normal process to confirm the on-track state (timing D).

The confirmation of the on-track state is also performed after the desired sector has passed through the magnetic head 13.

FIG. 6 is a diagram showing a timing at which a servo region is detected in a recording command. In the timing shown in FIG. 6, information is recorded on three sectors m, m+1, and m+2 subsequent to the servo region n.

The determination of whether or not the information has been correctly recorded on up to the last sector m+2, that is, whether or not the magnetic head 13 has moved up to the sector m+2 along the track, is performed by detecting the passing of the servo region n+1 subsequent to the sector m+2.

After the information has been recorded on the sector m+2, when the servo region n+1 passes through the magnetic head 13, the DSP 37 detects the passing of the servo region (timing A of FIG. 6), obtains the servo number n+1 of the servo region, and checks whether or not the servo number n+1 matches the number of the servo region next to the servo region specified by the MPU 31.

If the numbers match, the DSP 37 sends an on-track state notification together with the servo number to the MPU 31 (timing B). In response to the notification from the DSP 37, an interrupt occurs in the MPU 31 (timing C). The MPU 31 sets a flag indicating the on-track state and ends the interrupt process. The MPU 31 which has been recovered from the interrupt process checks the flag in the normal process to determine that the recording operation has been successfully performed, and sends a completion status X which represents the completion of the recording command to the host computer (timing E). This allows the host computer to detect the success of the recording operation.

Along with the process described above, the MPU 31 and the DSP 37 detect a bit flip in the program written in the RAM 32 and the SDRAM 23, and recover the program upon detection of a bit flip. In this embodiment, a bit flip in the program written in the RAM 32, which includes an instruction and tables, is first detected by the parity detector 321. When the MPU 31 which has specified an address reads an instruction and tables of a program from the RAM 32 which is parity-enabled, the parity detector 321 checks the parity of the read contents. Upon detection of a parity error, the parity detector 321 stores the address at which the error is detected in an internal register, and sets a flag indicating the detection of the error. The address at which the error is detected and the flag indicating the detection of the error are then read by the MPU 31. In this manner, finally, the MPU 31 detects the bit flip in the program written in the RAM 32.

In this embodiment, furthermore, a bit flip in the program written in the DSP RAM 39, which includes an instruction and tables for the DSP 37, is first detected by the parity detector 391. When the DSP 37 which has specified an address reads an instruction and tables of a program from the DSP RAM 39 which is parity-enabled, the parity detector 391 checks the parity of the read contents. Upon detection of a parity error, the parity detector 391 stores the address at which the error is detected in an internal register, and sets a flag indicating the detection of the error. The address at which the error is detected and the flag indicating the detection of the error are then read by the DSP 37. In this manner, finally, the DSP 37 detects the bit flip in the program written in the DSP RAM 39.

Figure 7:
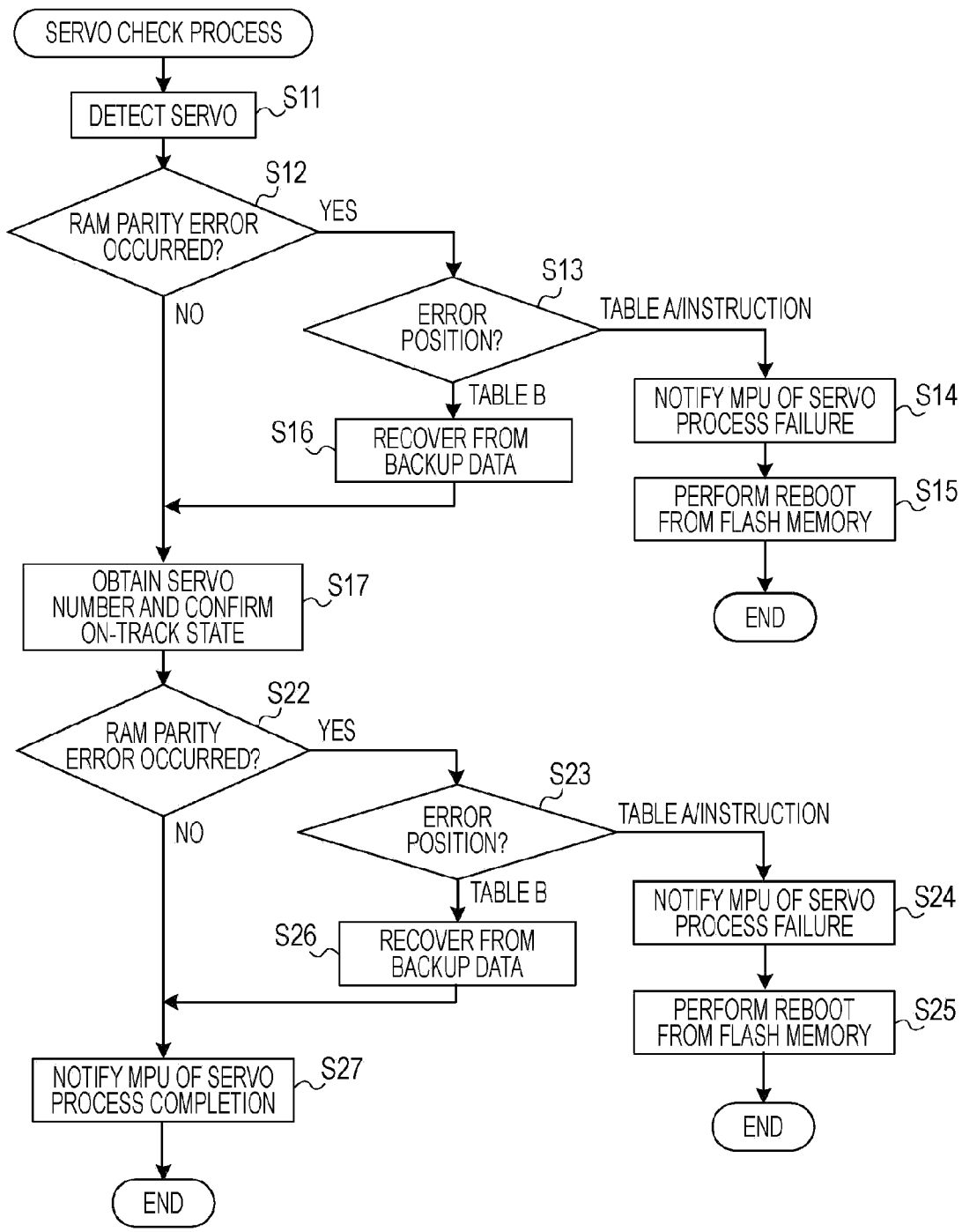
FIG. 7 is a flowchart showing a servo check process performed by a DSP shown in FIG. 2.

FIG. 7 is a flowchart showing a servo check process performed by the DSP 37 shown in FIG. 2. In FIG. 7, a process performed for a period from when the DSP 37 detects a servo region to when the DSP 37 notifies the MPU 31 of the on-track state is shown in correspondence with the timings A and B shown in FIG. 5. Although a servo process performed by the DSP 37 includes, in addition to the servo check process shown in FIG. 7, a process for controlling the SVC 25 in response to a command received from the MPU 31 and a process for controlling the SVC 25 prior to the on-track state, the processes are known in the art and will not be described in detail or shown in the Figures.

In the servo check process shown in FIG. 7, when a servo region arranged on a track of the magnetic disk 11 passes through the magnetic head 13, the DSP 37 detects the servo region via the RDC 24 (see FIG. 1) (operation S11). Then, the DSP 37 determines whether or not a parity error has occurred in the DSP RAM 39 (operation S12). More specifically, the DSP 37 determines whether or not a flag indicating detection of an error has been set in the parity detector 391. In a case where no parity error has occurred (No in operation S12), the DSP 37 performs a process of obtaining a servo number (operation S17). In a case where a parity error has occurred (Yes in operation S12), on the other hand, the DSP 37 confirms the position of the error (operation S13). More specifically, the DSP 37 reads an address at which the error is detected from the parity detector 391, and determines which of the instruction 421, the table A 423, and the table B 425 in the servo process firmware 42 written in the DSP RAM 39 contains the address at which the error is detected.

If it is determined in operation S13 as a result of the confirmation that the error has occurred in the table A 423 or the instruction 421, the DSP 37 notifies the MPU 31 of servo process failure (operation Si 4), and performs a reboot (restart) from the flash memory 21 (operation S15). This process allows the DSP 37 to restart. More specifically, the DSP 37 executes the initialization program stored in the DSP ROM 38. Thus, the DSP 37 reads the servo process firmware 42 (see FIG. 3) stored in the flash memory 21 (see FIG. 2), and writes a copy of the entirety of the servo process firmware 42 into both the DSP RAM 39 and the SDRAM 23. Then, the DSP 37 executes the instruction 421 written in the DSP RAM 39 from the beginning. Thus, the servo process is reset and abnormal control caused by a bit flip, which may be critical to the device, can be prevented. In response to the notification of the servo process failure received from the DSP 37, the MPU 31 completes the recording or reading of the information specified by the host computer, and causes the DSP 37 which has rebooted to execute a servo process again.

If it is determined in operation S13 as a result of the confirmation that the error has occurred in the table B 425, the DSP 37 performs a recovery process from the backup data (operation S16), and then performs a process of obtaining a servo number (operation S17). In the recovery process from the backup data in operation S16, the DSP 37 reads the copy of the table B 425 in the copy of the servo process firmware 42 written in the SDRAM 23, and writes it into a table B region in the DSP RAM 39. This allows the table B region to become in the initial state so that the error can be overcome.

The value of the table B 425 remains unchanged regardless of the execution of the instruction 421. The table B 425 into which the value read from the SDRAM 23 is written is recovered into a true, error-free state that is obtained before the time point at which the error was detected. If the error is detected in the table B 425, the table B 425 itself is merely recovered and the servo process continues. This can prevent reduction in the operation speed of the overall servo process.

After the recovery process of operation S16, the execution of the instruction 411 continues from where the process was being executed before the error was detected in operation S12, that is, from the process of obtaining a servo number and confirming the on-track state of operation S17.

In the process of obtaining a servo number and confirming the on-track state of operation S17, the DSP 37 obtains the servo number of the detected servo region from the RDC 24, and compares the obtained servo number to the desired servo number. If the servo number obtained from the RDC 24 matches the desired servo number, the on-track state in which the magnetic head 13 is located on the target track is obtained.

Then, the DSP 37 determines again whether or not a parity error has occurred in the DSP RAM 39 (operation S22). In the process of obtaining a servo number and confirming the on-track state of operation S17, the reading operation is performed in a broad range within the DSP RAM 39, and the parity detector 391 may have possibly detected a parity error.

The process to be performed when a parity error is detected is similar to that of operations S13 to S16 described above. Specifically, in a case where a parity error has occurred (Yes in operation S22), the DSP 37 confirms the position of the error (operation S23). If it is determined as a result of the confirmation that the error has occurred in the table A 423 or the instruction 411, the DSP 37 notifies the MPU 31 of servo process failure (operation S24), and performs a reboot from the flash memory 21 (operation S25). If it is determined as a result of the confirmation that the error has occurred in the table B 425, the DSP 37 performs a recovery process from the backup data (operation S26).

Then, in operation S27, the DSP 37 notifies the MPU 31 of servo process completion, and ends the servo check process. The DSP 37 performs the servo check process shown in FIG. 7 to notify the MPU 31 of the on-track state.

Here, a combination of the processes of operations S12 and S13 and operations S22 and S23, which are executed by the DSP 37, and the parity detector 391 may correspond to an example of the detector in the basic mode described above. The processes of operations S16 and S26 may correspond to an example of the constant recovery unit in the basic mode described above. The processes of operations S15 and S25 may correspond to an example of the restart unit in the basic mode described above.

Next, a process performed by the MPU 31 will be described.

Figure 8:
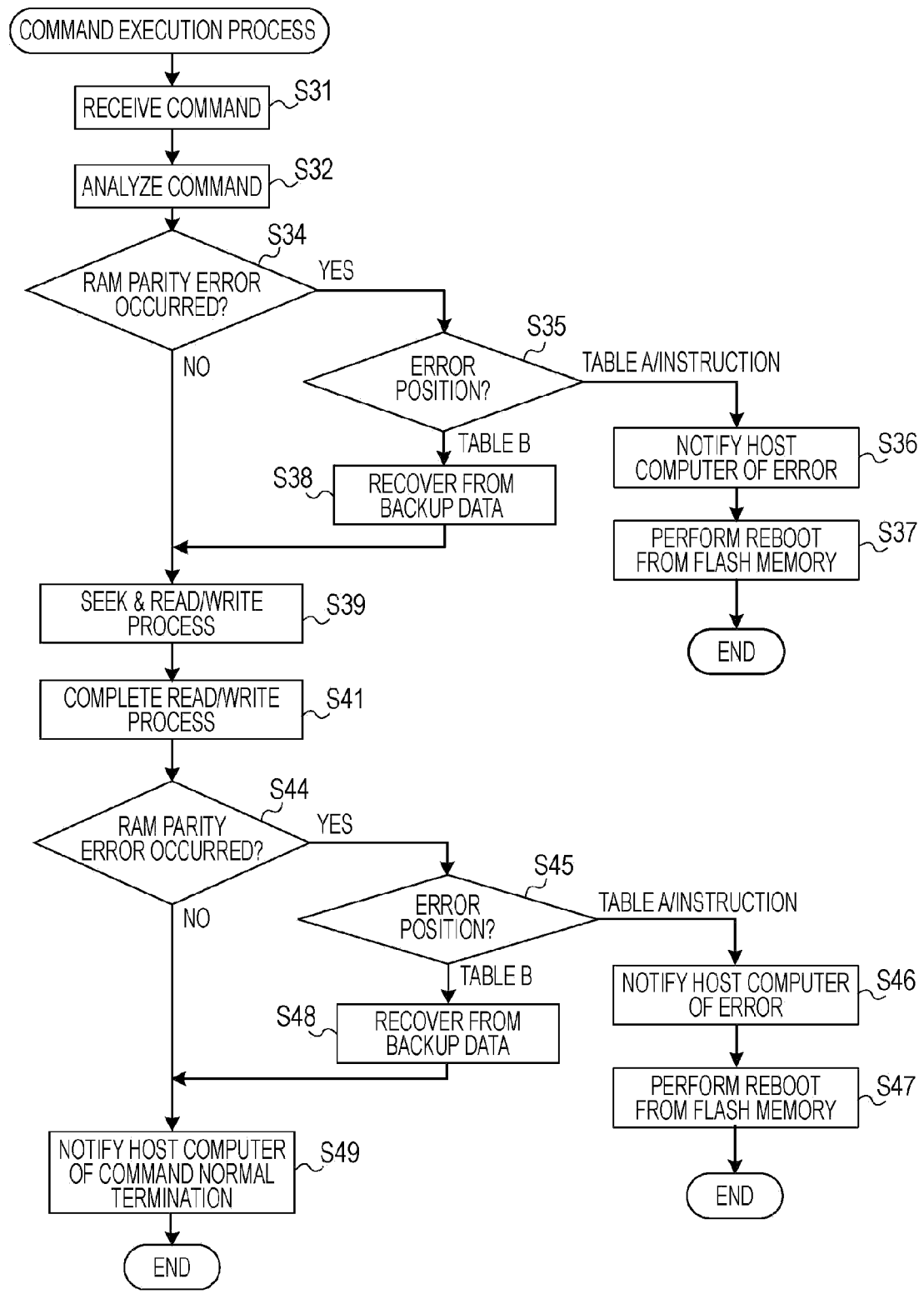
FIG. 8 is a flowchart showing a command execution process performed by an MPU shown in FIG. 2.

FIG. 8 is a flowchart showing a command execution process performed by the MPU 31 shown in FIG. 2.

In the command execution process, upon receiving a command from the external host computer (operation S31), the MPU 31 analyzes the command (operation S32). In the process of analyzing the command, a desired track number or servo number is determined from the value of a sector included in the command.

Then, the MPU 31 determines whether or not a parity error has occurred in the RAM 32 (operation S34). More specifically, the MPU 31 determines whether or not a flag indicating detection of an error has been set in the parity detector 321. In a case where no parity error has occurred (No in operation S34), the MPU 31 performs a seek and read/write process (operation S39). In a case where a parity error has occurred (Yes in operation S34), the MPU 31 confirms the position of the error (operation S35). More specifically, the MPU 31 reads an address at which the error is detected from the parity detector 321, and determines which of the instruction 411, the table A 413, and the table B 415 in the command process firmware 41 written in the RAM 32 contains the address at which the error is detected.

If it is determined in operation S35 as a result of the confirmation that the error has occurred in the table A 413 or the instruction 411, the MPU 31 notifies the host computer of the error (operation S36), and performs a reboot from the flash memory 21 (operation S37). This process allows the MPU 31 to restart. More specifically, the MPU 31 executes the initialization instruction stored in the ROM 35. Thus, the MPU 31 reads the command process firmware 41 (see FIG. 3) stored in the flash memory 21 (see FIG. 2), and writes a copy of the entirety of the command process firmware 41 into both the RAM 32 and the SDRAM 23. Then, the MPU 31 starts the execution of the instruction 411.

Thus, the command execution process is reset and abnormal control caused by a bit flip, which may be critical to the device, can be prevented. Note that the MPU 31 may receive a plurality of commands from the host computer and may hold commands in an execution queue. The execution completion of the commands in the execution queue is not notified when the command execution process is reset, and the host computer regards the commands in the execution queue as timeout errors.

If it is determined in operation S35 as a result of the confirmation that the error has occurred in the table B 415, the MPU 31 performs a recovery process from the backup data (operation S38), and then performs a seek and read/write process (operation S39). In the recovery process from the backup data in operation S38, the MPU 31 reads the copy of the table B 415 in the copy of the command process firmware 41 written in the SDRAM 23, and writes it into a table B region in the RAM 32. This allows the table B region to become in the initial state so that the error can be overcome. The value of the table B 415 remains unchanged regardless of the execution of the instruction 411.

The table B 415 into which the value read from the SDRAM 23 is written is recovered into a true, error-free state that is obtained before the time point at which the error was detected. Furthermore, unlike an error found in the table A 413, which is required to execute the instruction 411, even in a situation where an error is found in the table B 415, the MPU 31 may have possibly executed the instruction 411. Therefore, if the error is detected in the table B 415, the table B 415 itself is merely recovered and the command execution process continues. This can prevent reduction in the operation speed of the overall command execution process.

In the seek and read/write process of operation S39, the MPU 31 supplies the obtained track number and servo number to the DSP 37 so that a servo process is performed, and performs an information recording or reading setting on the host IF 22 and the RDC 24. Consequently, the DSP 37 detects the desired track number and servo number, and the recording or reading operation with respect to the desired sector on the magnetic disk 11 is performed via the host IF 22 and the RDC 24 (operation S41).

When the recording or reading operation is completed (operation S41), the MPU 31 determines again whether or not a parity error has occurred in the RAM 32 (operation S44). The process to be performed when a parity error is detected is similar to that of operations S34 to S38 described above. Specifically, in a case where a parity error has occurred (Yes in operation S44), the MPU 31 confirms the position of the error (operation S45).

If it is determined as a result of the confirmation that the error has occurred in the table A 413 or the instruction 411, the MPU 31 notifies the host computer of the error (operation S46), and performs a reboot from the flash memory 21 (operation S47). If it is determined as a result of the confirmation that the error has occurred in the table B 415, the MPU 31 performs a recovery process from the backup data (operation S48), and then performs a seek and read/write process (operation S49).

In the process of operation S49, the MPU 31 notifies the host computer of normal termination of the command received in operation S31. Therefore, the host computer recognizes that the recording or reading of the information has been completed.

Here, a combination of the processes of operations S34 and S35 and operations S44 and S45, which are executed by the MPU 31, and the parity detector 321 may correspond to an example of the detector in the basic mode described above. The processes of operations S38 and S48 may correspond to an example of the constant recovery unit in the basic mode described above. The processes of operations S37 and S47 may correspond to an example of the restart unit in the basic mode described above.

Figure 9:
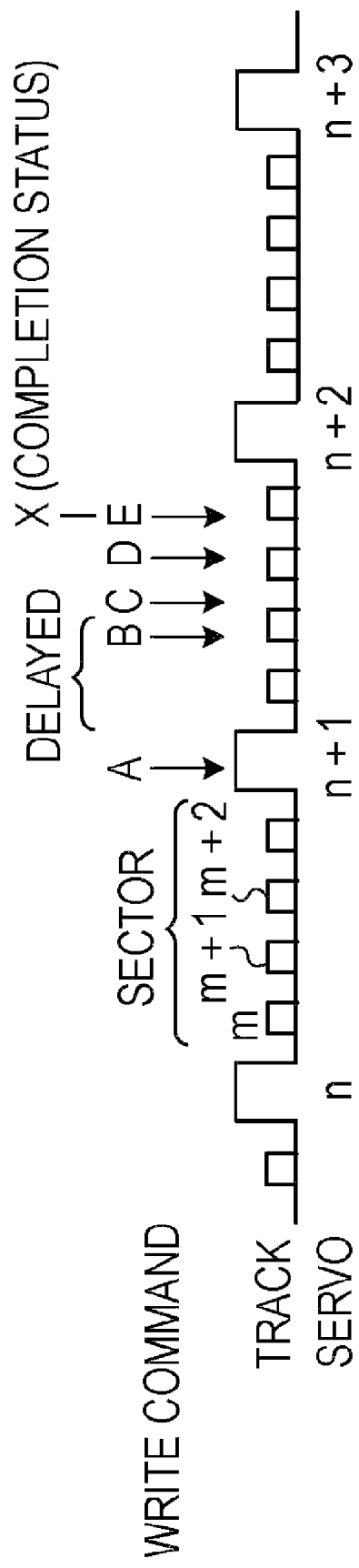
FIG. 9 is a diagram showing a detection timing in a comparative example to the present embodiment shown in FIG. 6, in which it is assumed that an ECC memory is used.

FIG. 9 is a diagram showing a detection timing in a comparative example to the present embodiment shown in FIG. 6, in which it is assumed that an ECC memory is used.

As shown in FIG. 9, due to the large access delay caused by an error correction circuit, the use of an ECC memory results in delay in the timing (timing B) at which an on-track state notification as well as the servo number is sent to the MPU 31. Consequently, the timing (timing E) at which the MPU 31 sends a completion status X which represents the completion of the recording command to the host computer is delayed.

According to this embodiment, in contrast, it is only required to check the occurrence of a parity error. Thus, a response to the servo check is made without delay in the manner shown in FIG. 6.

The process performed by the MPU 31 in response to a command received from the host computer has been described. Next, a RAM patrol process which is executed when no command is received will be described.

The RAM patrol process is executed when there are no unprocessed commands which have been received from the host computer. In the RAM patrol process, the MPU 31 sequentially reads all the instruction and tables written in the RAM 32 word-by-word, and detects a parity error. A checksum is checked for each block into which the instruction and tables are sectioned by a predetermined number of words. When a command is received, the RAM patrol process is interrupted and a process in response to the command is performed. After the completion of the process in response to the command, the RAM patrol process continues from where it was interrupted.

Figure 10:
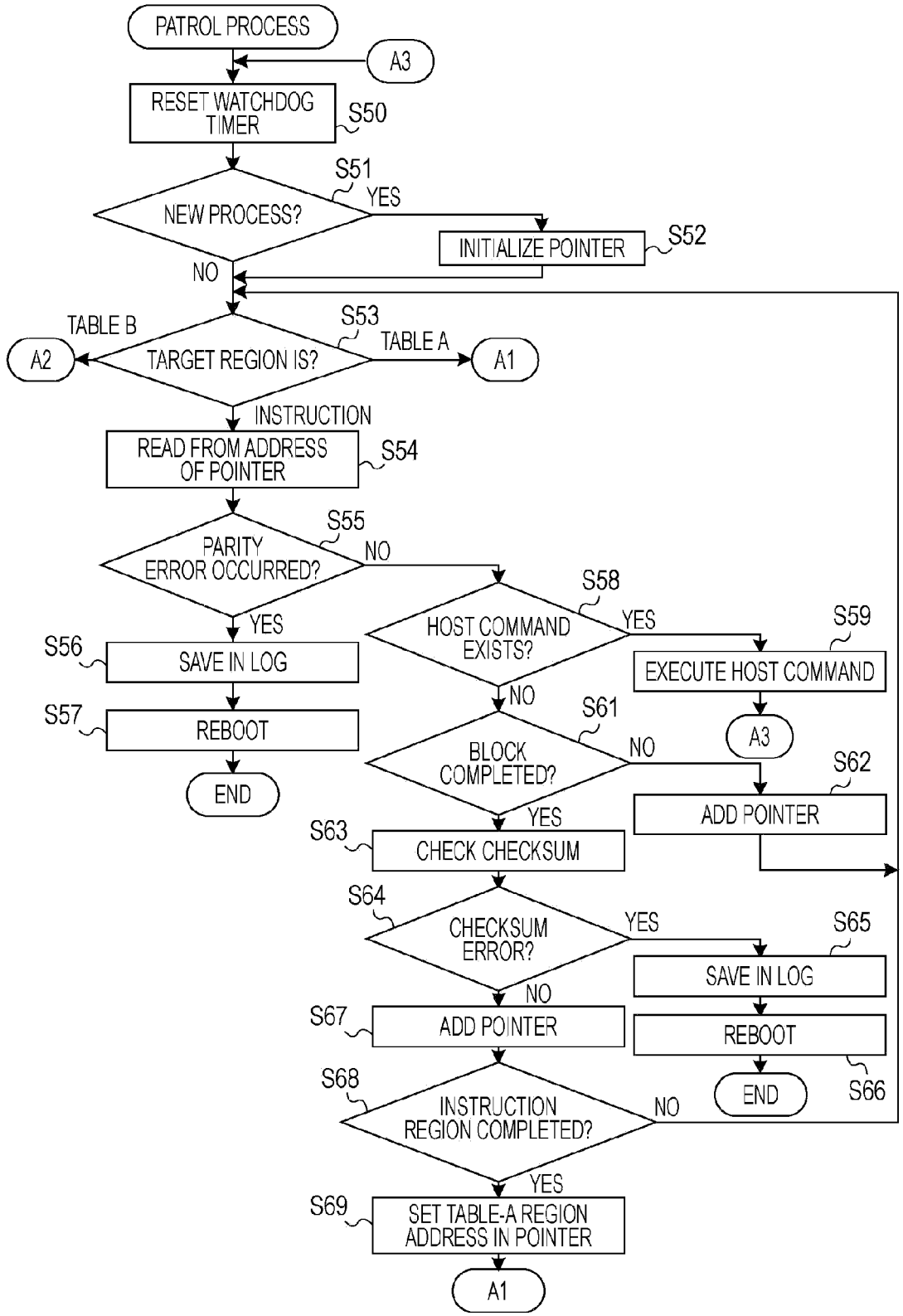
FIG. 10 is a flowchart showing a RAM patrol process performed by the MPU.
Figure 11:
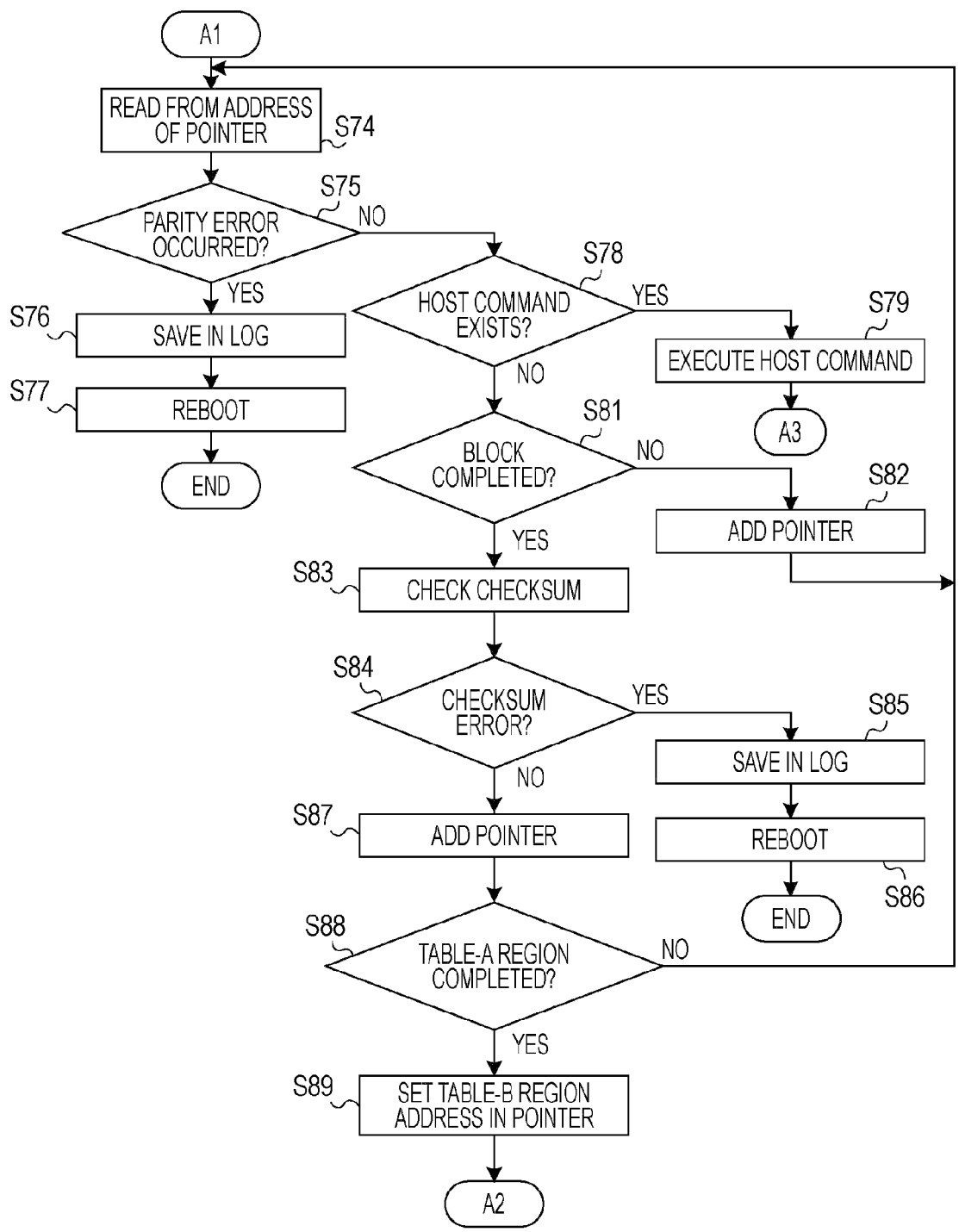
FIG. 11 is a flowchart showing a process subsequent to the flowchart of FIG. 10.
Figure 12:
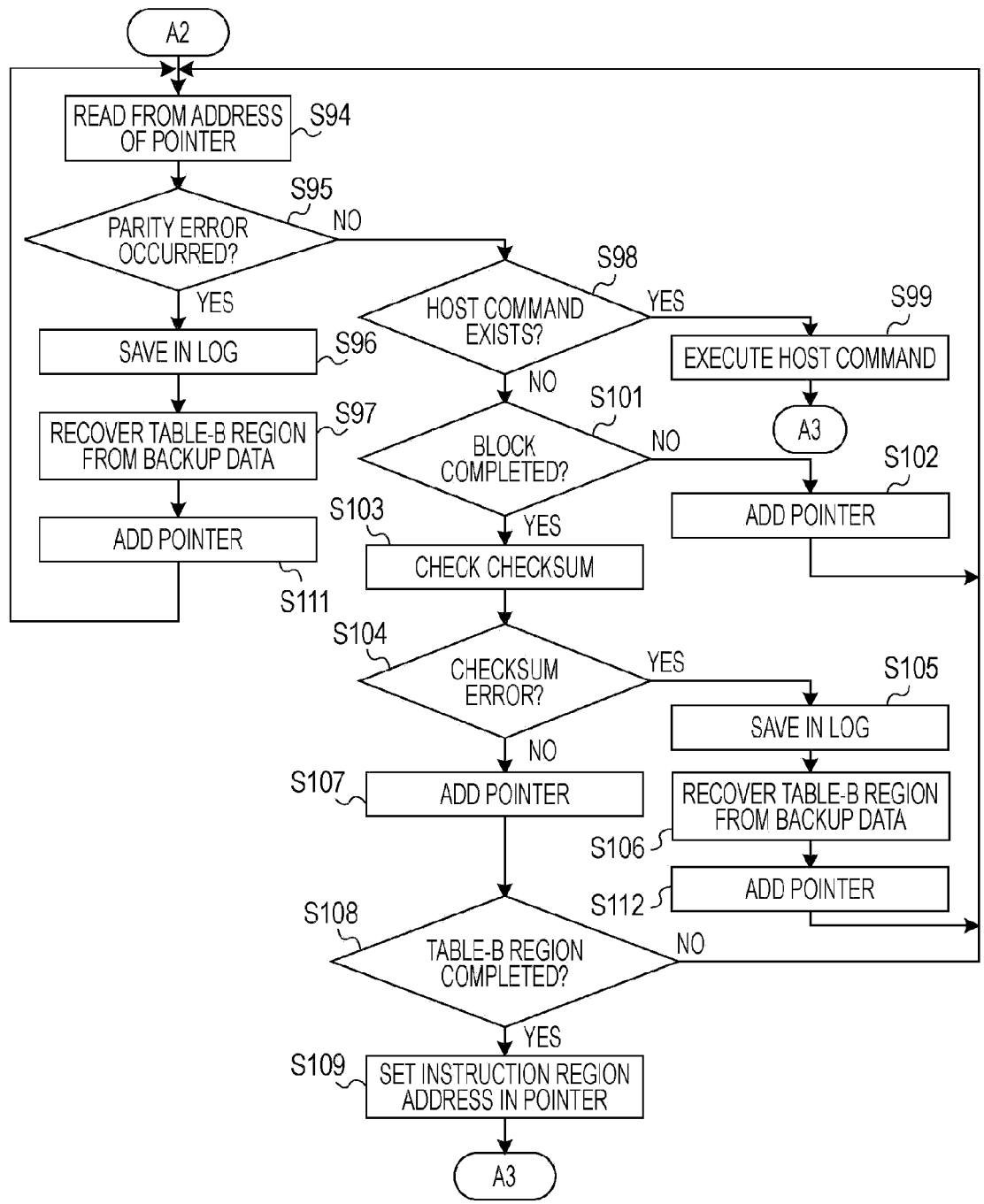
FIG. 12 is a flowchart showing a process subsequent to the flowchart of FIG. 11.

FIGS. 10, 11, and 12 are flowcharts showing a RAM patrol process performed by the MPU 31. FIG. 10 shows a process to be performed on a region where the instruction 411 is written in the RAM 32. FIG. 11 shows a process to be performed on a region where the table A 413 is written. FIG. 12 shows a process to be performed on a region where the table B 415 is written.

In the RAM patrol process, first, the MPU 31 resets the watchdog timer 311 (operation S50). More specifically, the MPU 31 sets a period of time that is required until the watchdog timer 311 generates an initialization request interrupt. The period of time may be predetermined, such as five seconds. The watchdog timer 311 is reset after the set period of time, and starts time counting for five seconds. When five seconds have elapsed since the start of counting, the watchdog timer 311 generates an initialization request interrupt, and the MPU 31 performs a reboot from the flash memory 21 in response to the initialization request interrupt.

The process of operation S50 is implemented at intervals of five seconds or less, and the watchdog timer 311 is reset each time the processing is performed. Thus, a reboot caused by the initialization request interrupt of the watchdog timer 311 does not occur unless the MPU 31 operates without control. A watchdog timer reset process will be described in more detail below.

Then, the MPU 31 determines whether a new process is to be performed or the process that was interrupted in response to the received command is to continue (operation S51). If a new process after power is turned on or after a reboot is to be performed, a pointer is initialized (operation S52). More specifically, the beginning address of the instruction region where which the instruction 411 is written in the RAM 32 is set in a pointer that represents an address targeted for error detection.

Then, a target region for error detection is determined from the address of the pointer (operation S53). If the target region specified by the pointer is the instruction 411, the process of operation S54 is performed. If the target region is the table A 413, the process of operation S74 (see FIG. 11) is performed. If the target region is the table B 415, the process of operation S94 (see FIG. 12) is performed.

In operation S54 shown in FIG. 10, the MPU 31 performs a reading operation starting from the address specified by the pointer of the RAM 32. Then, the MPU 31 determines whether or not a parity error has occurred on the basis of a detection flag of the parity detector 321 (operation S55).

In a case where a parity error has occurred (Yes in operation S55), the MPU 31 saves information of the address in a log of the flash memory 21 as a record (operation S56), and performs a reboot process from the flash memory 21 (operation S57). The log is used for later fault analysis or the like. The reboot process is the same as or similar to the reboot (operation S37) in the command execution process described with reference to FIG. 8. This process allows the MPU 31 to restart.

In a case where no parity error has occurred (No in operation S55), if there is a command received from the host computer (Yes in operation S58), the RAM patrol process is interrupted and the process in response to the command is executed (operation S59). After the process in response to the command has been completed, the RAM patrol process resumes. If there is no command (No in operation S58), it is determined whether or not one of a plurality of blocks that form the instruction 411 has been completed (operation S61). If one block has not been completed (No in operation S61), the pointer is added (operation S62) and the reading operation (operation S54) is repeated. If one block has been completed (Yes in operation S61), the checksum is checked (operation S63).

More specifically, the MPU 31 calculates a checksum from the values of previously read blocks, and determines whether or not the checksum matches a value corresponding to a target block in the checksum 412 of the instruction 411 in the copy of the command process firmware 41 written in the SDRAM 23. If a checksum error is detected (Yes in operation S64), the saving in the log is also performed (operation S65), and a reboot process is performed (operation S66).

If no checksum error is detected (No in operation S64), the pointer is added (operation S67). If the region of the instruction 411 has not been completed (No in operation S68), the reading operation (operation S54) is repeated. If the region of the instruction 411 has been completed (Yes in operation S68), the address of the region in which the table A 413 is written in the RAM 32 is set in the pointer (operation S69), and the table A is checked for an error (operation S74 shown in FIG. 11).

The error check for the table A 413 shown in FIG. 11 is performed in a manner similar to that of the error check for the instruction 411 shown in FIG. 10. Specifically, the processes of operations S74 to S89 shown in FIG. 11 are similar to the processes of operations S54 to S69 shown in FIG. 10, respectively. The error check shown in FIG. 11 is different from that shown in FIG. 10 in the address of the RAM 32 which is targeted for error detection. In the error check for the table A 413 shown in FIG. 11, if the region of the table A 413 has been completed (Yes in operation S88), the address of the region in which the table B 415 is written in the RAM 32 is set in the pointer (operation S89), and the table B 415 is checked for an error (operation S94 in FIG. 12).

The error check for the table B 415 shown in FIG. 12 is performed in a manner almost similar to that of the error check for the instruction 411 shown in FIG. 10. Specifically, the processes of operations S94 to S109 shown in FIG. 12 are similar to the processes of operations S54 to S69 shown in FIG. 10, respectively.

The error check shown in FIG. 12 is different from that shown in FIG. 10 in the address of the RAM 32 which is targeted for error detection. One difference is that, if a parity error is detected (Yes in operation S95) in the error check for the table B 415 shown in FIG. 12, and if a checksum error is detected (Yes in operation S104), only the table B region is recovered from the backup data in the SDRAM 23 (operations S97 and S106), in a manner similar to that in operation S38 shown in FIG. 8, instead of performing a reboot process from the flash memory 21 involving a reset. The pointer is added (operations S11 and S112), and the error check continues.

Another difference is that, in the error check for the table B 415, if the region of the table B 413 has been completed (Yes in operation S108), the address of the region into which the instruction 411 is written in the RAM 32 is set in the pointer (operation S109), and the instruction 411 is checked for an error (operation S50 of FIG. 10). After the error check for the table B 415 has been completed, the error check operation is repeated, starting from an error check for the instruction 411 (operation S54 of FIG. 10). Furthermore, each time the error check operation is repeated, the watchdog timer 311 is reset (operation S50 of FIG. 10).

A process executed by the MPU 31 includes an interrupt process (exceptional process) which is executed in response to a hardware interrupt such as a timer interrupt or an external interrupt, and a normal process which is repeatedly executed when no interrupt process is being executed, such as the patrol process as described above. The normal process includes normal sequential tasks and branch tasks. In the present embodiment, the reset of the watchdog timer 311 is repeatedly performed (operation S50 of FIG. 10) in the normal process or the patrol process rather than in the interrupt process.

Figure 13:
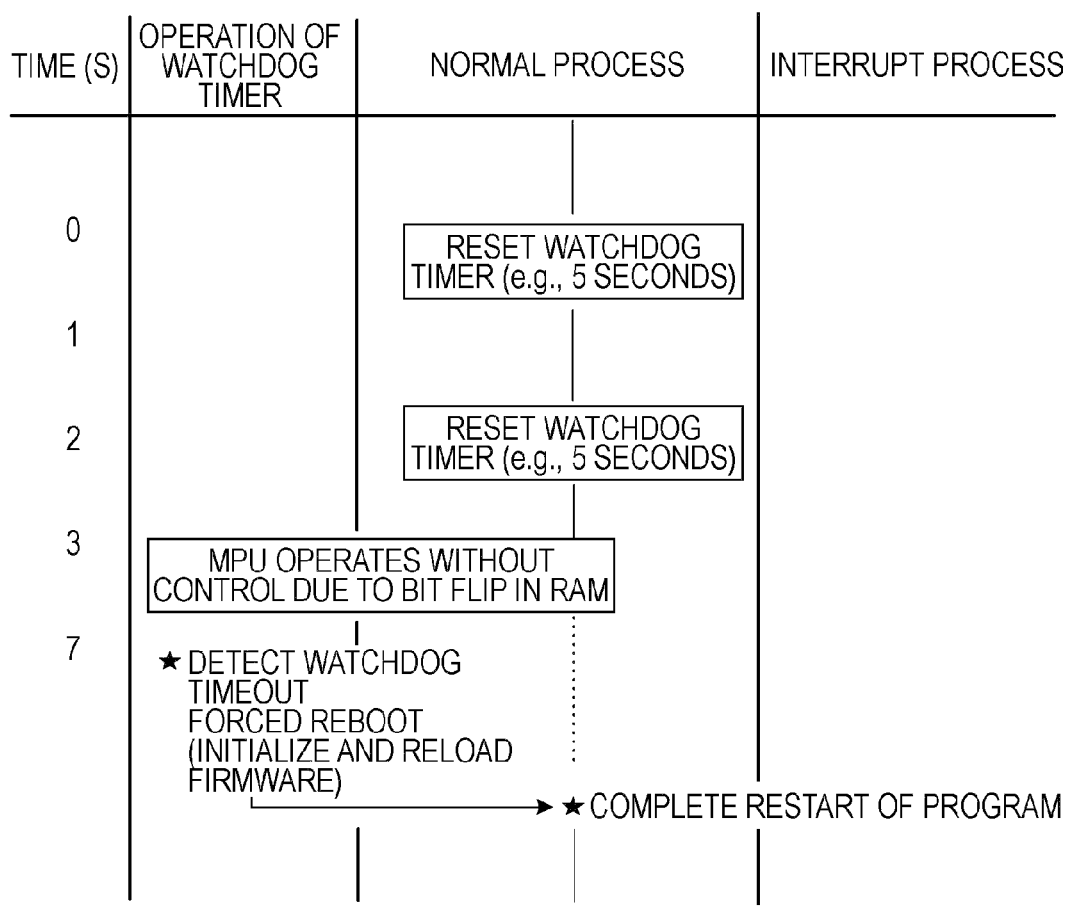
FIG. 13 is a time chart showing states in a process involving a watchdog timer shown in FIG. 2.

FIG. 13 is a time chart showing states in a process involving the watchdog timer 311 shown in FIG. 2. In FIG. 13, the operation of the watchdog timer 311 and an example of the process of setting the watchdog timer 311 are shown over time.

In the example shown in FIG. 13, the watchdog timer 311 is reset by the MPU 31 (at the time of 0 s) in the watchdog timer reset process (operation S50 of FIG. 10) within the patrol process or the normal process. At this time, a period of five seconds is set in the watchdog timer 311 as a predetermined period of time required until an initialization request interrupt is generated. After a round of checks for the RAM 32 in the patrol process has been performed, the watchdog timer 311 is reset again (at the time of 2 s). The MPU 31 resets the watchdog timer 311 before the predetermined period of five seconds has elapsed during the execution of the patrol process included in the program written in the RAM 32. As long as the watchdog timer 311 is reset within a period of five seconds, no initialization request interrupt is generated.

If the MPU 31 operates without control because a bit flip has occurred in the RAM 32 but this error is not detected by the parity check, the watchdog timer reset process (operation S50 of FIG. 10) is not executed. Consequently, the watchdog timer 311 generates an initialization request interrupt at a time point (at the time of 7 s) when five seconds have elapsed since the previous reset. This allows the MPU 31 to restart.

More specifically, the MPU 31 executes the initialization program in the ROM 35 to initialize each unit in the MCU 30, and writes the program read from the flash memory 21 into the RAM 32. According to the present embodiment, the watchdog timer reset process is included in the RAM patrol process which is the normal process rather than in the interrupt process.

Here, a combination of the processes of operations S54, S55, and S56, the processes of operations S74, S75, and S76, the processes of operations S94, S95, and S96, which are executed by the MPU 31, and the parity detector 321, and each of the processes of operations S63, S64, and S65, the processes of operations S83, S84, and S85, and the processes of operations of S103, S104, and S105 may correspond to examples of the detector in the basic mode described above. Each of the processes of operations S97 and S106 may correspond to an example of the constant recovery unit in the basic mode described above. Each of the processes of operations S57, S66, S77, and S86 may correspond to an example of the restart unit in the basic mode described above.

Figure 14:
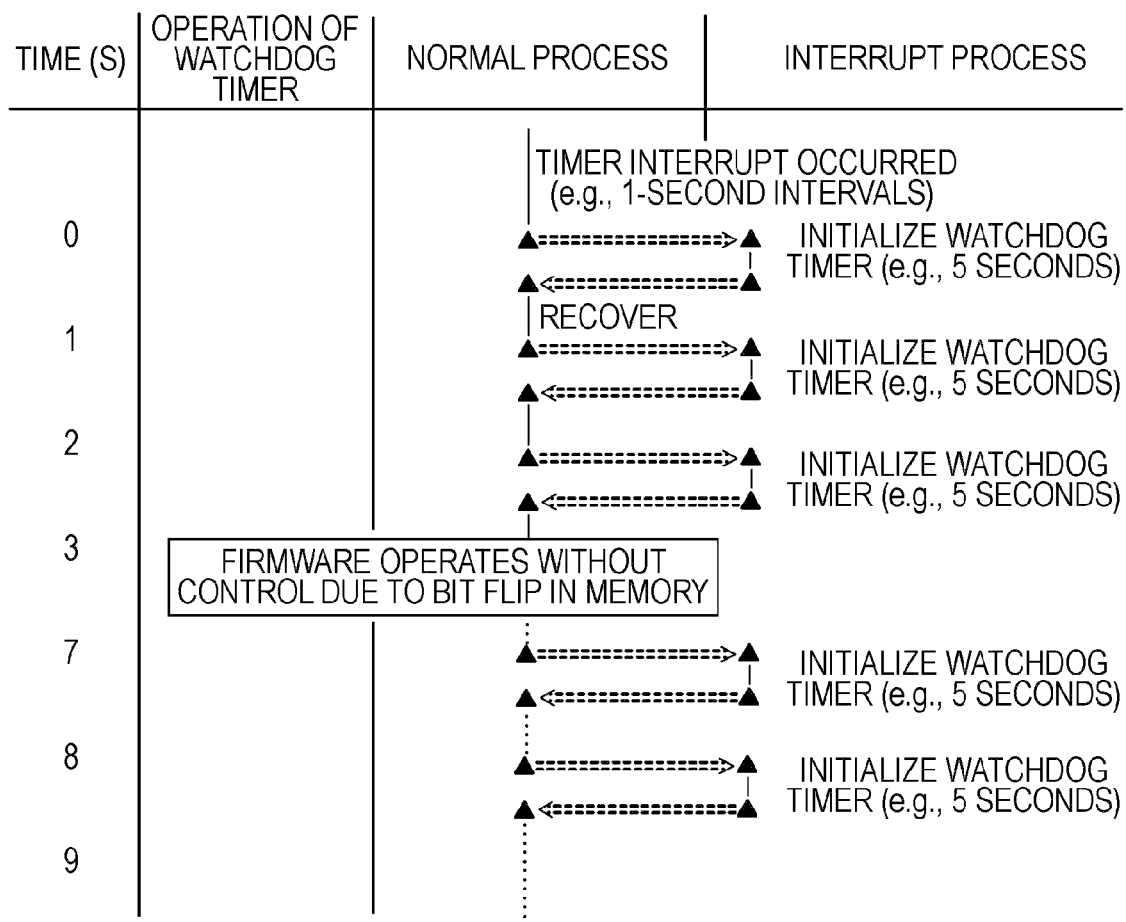
FIG. 14 is a time chart showing a process in a comparative example to the present embodiment, in which a watchdog timer reset process is executed as a timer interrupt process.

FIG. 14 is a time chart showing a process in a comparative example, in which a watchdog timer reset process is executed as a timer interrupt process.

A regular reset of the watchdog timer 311 can also be executed as an interrupt process such as a timer interrupt process. However, since the execution of this process is started by a timer which is a timer interrupt hardware component, the operation may possibly be correctly performed regardless of whether or not the MPU 31 operates without control due to an bit flip in the RAM 32. For example, as shown in FIG. 13, a watchdog timer reset process is executed by a timer interrupt process using a timer that is set to 1 second. In this case, even when the MPU 31 operates without control due to a bit flip in the RAM 32 (at the time of 3 s), the watchdog timer 311 does not generate an initialization request interrupt because the watchdog timer reset process is executed every 1 second. [00108] In the example of the present embodiment shown in FIG. 13, in contrast, the MPU 31 resets the watchdog timer 311 during the execution of the patrol process included in the program written in the RAM 32. This can prevent malfunction of the HDD 1 or damage to the magnetic disk 11, which may be caused by the MPU 31 which operates without control, even when a bit flip in the RAM 32 is not successfully detected by the parity check.

Next, an HDD which is a specific second embodiment of the device will be described. In the following description of the second embodiment, the same elements as or elements similar to those in the first embodiment described above are assigned the same reference numerals, and differences from the foregoing embodiment will be described.

An HDD which is a specific second embodiment is configured such that the two parity detectors 321 and 391 are removed from the control circuit 20 (see FIG. 2) of the HDD 1 (see FIG. 1) of the first embodiment. In the HDD of the second embodiment, furthermore, an MPU and a DSP execute processes different from those of the first embodiment. The remaining elements in the HDD of the second embodiment are the same as those of the first embodiment, and will be described using the Figures and reference numerals in the first embodiment described above.

In the second embodiment, in the servo check process, instead of detecting a parity error in the RAM 32, the DSP 37 calculates a checksum to detect a bit flip.

Figure 15:
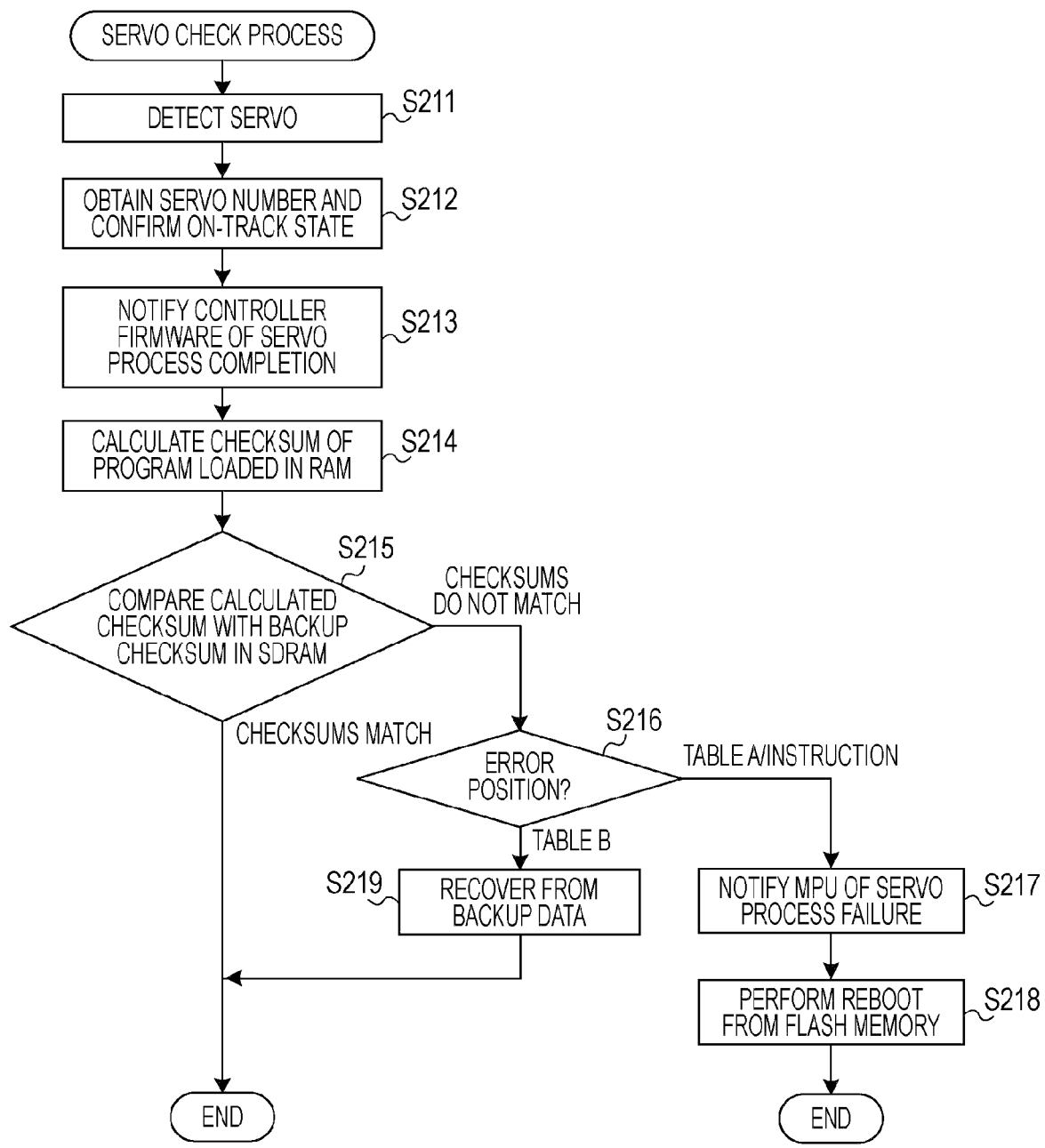
FIG. 15 is a flowchart showing a servo check process performed by a DSP according to a second embodiment.

FIG. 15 is a flowchart showing a servo check process performed by the DSP 37 according to the second embodiment.

In the servo check process shown in FIG. 15, when a servo region arranged on a track on the magnetic disk 11 passes through the magnetic head 13, the DSP 37 detects the servo region via the RDC 24 (see FIG. 2) (operation S211). Then, the DSP 37 performs a process of obtaining a servo number (operation S212). Then, in operation S213, the DSP 37 notifies the MPU 31 of servo process completion. The processes of operations S212 and S213 are the same as or similar to the processes of obtaining a servo number in operation S17 and sending a notification of servo process completion in operation S27 shown in FIG. 7 described above, respectively. The DSP 37 performs the servo check process to notify the MPU 31 of the on-track state.

Then, the DSP 37 executes a checksum calculation process of the program loaded in the DSP RAM 39 (operation S214). As shown in FIG. 3, the servo process firmware 42 stored in the flash memory 21 has an instruction 421, a table A 423, and a table B 425. Each of the instruction 421, the table A 423, and the table B 425 is formed of blocks each having a predetermined number of words, and checksums 422, 424, and 426 are stored for the respective blocks. A copy of the servo process firmware 42 stored in the flash memory 21 is written into both the DSP RAM 39 and the SDRAM 23.

In the calculation process of operation S214, checksums are calculated for all the blocks included in each of the instruction 421, the table A 423, and the table B 425 written in the DSP RAM 39. Then, the DSP 37 compares the calculated checksums to backup checksums in the SDRAM 23 (operation S215). As described above, as shown in FIG. 3, a copy of the servo process firmware 42 stored in the flash memory 21, including checksums, is written into the SDRAM 23 as a backup. In operation S215, the calculated checksums are compared with the checksums written in the SDRAM 23.

If it is determined in operation S215 as a result of the comparison between the checksums that all the checksums match, the servo check process ends. If it is determined in operation S215 as a result of the comparison between the checksums that the checksums do not match, the DSP 37 confirms the position of an error (operation S216). More specifically, the DSP 37 determines which of the instruction 421, the table A 423, and the table B 425 in the servo process firmware 42 written in the DSP RAM 39 contains the portion where the checksums do not match.

If it is determined in operation S216 as a result of the confirmation that an error has been found in the table A 423 or the instruction 421, the DSP 37 notifies the MPU 31 of servo process failure (operation S217), and performs a reboot from the flash memory 21 (operation S218). This process allows the DSP 37 to restart. Although the MPU 31 has been notified of the servo process completion in operation S213, the MPU 31 is notified of the servo process failure in operation S217 to thereby recognize that the servo process performed by the DSP 37 has failed.

If it is determined in operation S216 as a result of the confirmation that an error has been found in the table B 425, the DSP 37 performs a recovery process from the backup data (operation S219), and then ends the servo check process. This allows the table B region to become in the initial state so that the error can be overcome.

Here, the processes of operations S211 to S213, which are executed by the DSP 37, may correspond to an example of the request processing unit in the basic mode and applied mode described above. The processes of operations S214 to S216 may correspond to an example of the detector in the basic mode and applied mode described above.

Figure 16:
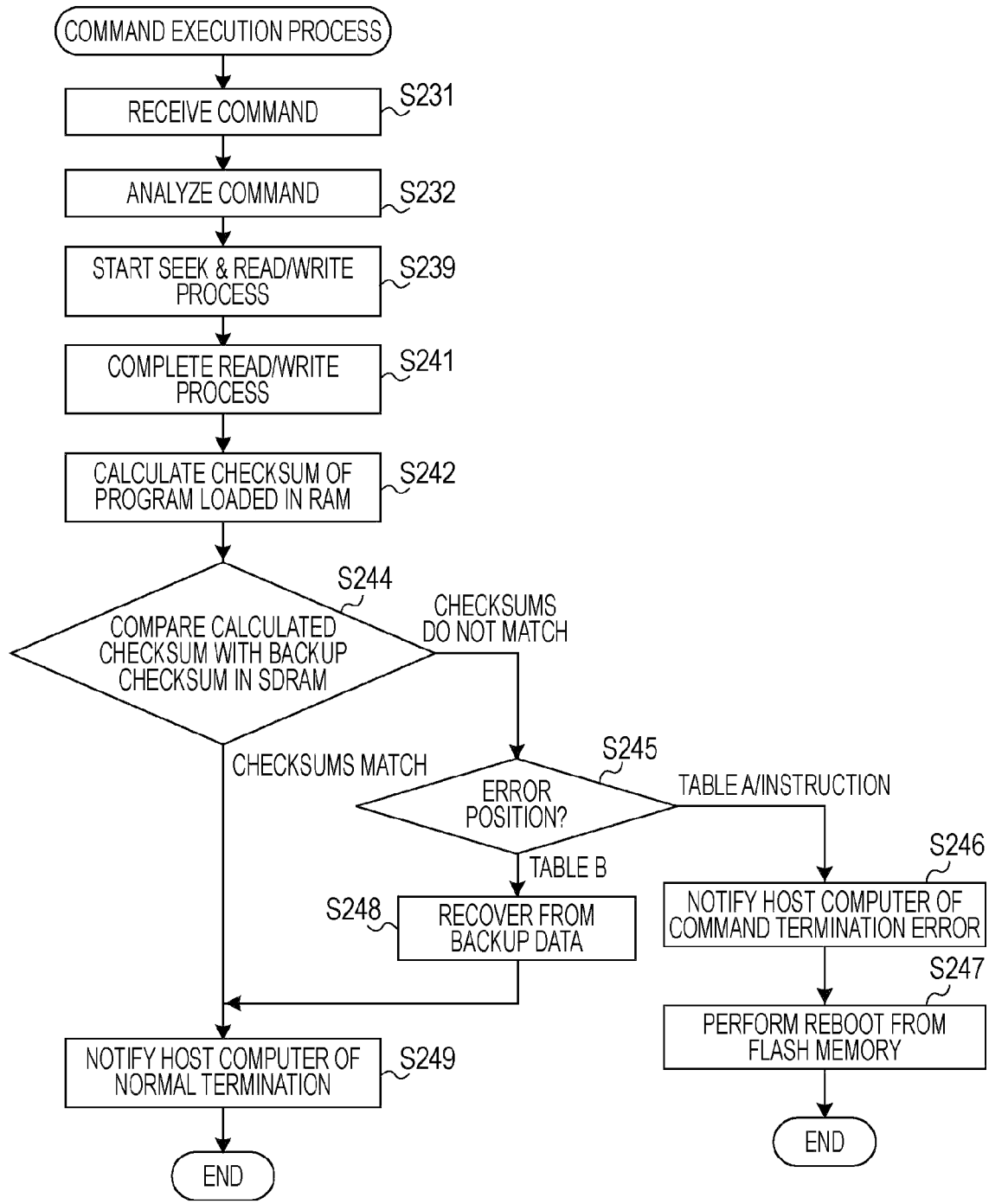
FIG. 16 is a flowchart showing a command execution process performed by an MPU according to the second embodiment.

FIG. 16 is a flowchart showing a command execution process performed by the MPU 31 according to the second embodiment.

In the command execution process shown in FIG. 16, the processes of operations S231 and S232 are the same as or similar to the processes of operations S31 and S32 shown in FIG. 8, respectively, and the processes of operations S239, S241, and S249 shown in FIG. 16 are the same as or similar to the processes of operations S39, S41, and S49 shown in FIG. 8, respectively. Differences between the command execution process shown in FIG. 16 and the command execution process shown in FIG. 8 will now be described.

In the command execution process, when the recording or reading operation is completed (operation S241), the MPU 31 executes a checksum calculation process of the program loaded in the RAM 32 (operation S242).

The command process firmware 41 stored in the flash memory 21 has an instruction 411, a table A 413, and a table B 415. Each of the instruction 411, the table A 413, and the table B 415 is formed of blocks each having a predetermined number of words, and checksums 412, 414, and 416 are stored for the respective blocks. A copy of the command process firmware 41 stored in the flash memory 21 is written into both the RAM 32 and the SDRAM 23. In the calculation process of operation S242, checksums are calculated for all the blocks included in each of the instruction 411, the table A 413, and the table B 415 written in the RAM 32. Then, the MPU 31 compares the calculated checksums to backup checksums in the SDRAM 23 (operation S244). As described above, as shown in FIG. 3, a copy of the command process firmware 41 stored in the flash memory 21, including checksums, is written into the SDRAM 23 as a backup. In operation S244, the calculated checksums are compared with the checksums written in the SDRAM 23.

If it is determined in operation S244 as a result of the comparison between the checksums that all the checksums match, the MPU 31 notifies the host computer of command normal termination (operation S249). If it is determined in operation S244 as a result of the comparison between the checksums that the checksums do not match, the MPU 31 confirms the position of an error (operation S245). If it is determined as a result of the confirmation that an error has been found in the table A 413 or the instruction 411, the MPU 31 sends a command termination error notification (operation S246), and performs a reboot from the flash memory 21 (operation S247). This process allows the MPU 31 to restart.

If it is determined in operation S244 as a result of the confirmation that an error has been found in the table B 415, the MPU 31 performs a recovery process from the backup data (operation S248), and then notifies the host computer of command normal termination (operation S249).

As described with reference to FIG. 15, the DSP 37 detects an error after the processes of operations S211 to S214 in response to a servo check request sent from the MPU 31 which is a controller external to the DSP 37 has been completed. Therefore, even with the use of checksums which may require more time for error detection, a delay caused by a response to the servo check can be reduced.

In the foregoing description with respect to the embodiments, the HDD 1 is shown as an example of the device in the basic mode. Alternatively, the device may be implemented by, other than an HDD, a recording device such as an optical disk or tape drive or an electronic control device other than a recording device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A program processing device comprising:
a non-volatile storage that stores a program, variable data whose value changes in accordance with execution of the program, and constant data whose value is constant regardless of the execution of the program;
a volatile storage; and
a controller that reads the program, the initial value of the variable data, and the constant data stored in the non-volatile storage, writes the read program, initial value of the variable data, and constant data into the volatile storage, and then executes the program written into the volatile storage, wherein the controller includes
a detector configured to detect a bit flip in the program, the variable data, and the constant data stored in the volatile storage,
a constant recovery unit configured to, when the detector detects an error in the constant data, read the constant data from the non-volatile storage, write the read constant data into the volatile storage, and then continue the execution of the program from a point at which the program was being executed before the detector detected the error, and
a restart unit configured to, when the detector detects an error in one of the variable data and the program, read the program, the initial value of the variable data, and the constant data from the non-volatile storage, write the read program, initial value of the variable data, and constant data into the volatile storage, and then execute the program written into the volatile storage from a beginning of the program.

2. The program processing device according to claim 1, wherein the controller includes a request processing unit configured to perform a process and a response in accordance with a processing request sent from outside, and
wherein the detector is configured to detect an error after the request processing unit has completely performed a process and a response.

3. The program processing device according to claim 1, wherein the detector is configured to detect an error by calculating a checksum from each of the program, the variable data, and the constant data stored in the volatile storage.

4. The program processing device according to claim 1, wherein the volatile storage is configured to store a parity code along with each of the program, the variable data, and the constant data, and
wherein the detector is configured to detect an error by checking states of the parity codes read along with the program, the variable data, and the constant data from the volatile storage.

5. The program processing device according to claim 1, wherein the detector is configured to store a record of a detected error in the non-volatile storage.

6. The program processing device according to claim 1, further comprising a watchdog timer configured to generate an initialization request interrupt each time a predetermined period of time has elapsed,
wherein the restart unit is configured to further cause the controller to execute the program written into the volatile storage from the beginning when the watchdog timer generates an initialization request interrupt, and
wherein the controller is configured to, when the program written into the volatile storage is being executed, reset the watchdog timer before the predetermined period of time in the watchdog timer has elapsed.

7. The program processing device according to claim 1, further comprising:
an information recording medium on which information is recorded; and
an information recording unit configured to record information on the information recording medium,
wherein the controller is configured to control the information recording unit to record information on the information recording medium.

8. A program processing method comprising:
writing a program, an initial value of variable data whose value changes in accordance with execution of the program, and constant data whose value is constant regardless of the execution of the program into a volatile storage,
detecting a bit flip in the program, the variable data, and the constant data stored in the volatile storage;
reading the constant data from the non-volatile storage when an error is detected in the constant data;
writing the read constant data into the volatile storage;
continuing the execution of the program from a point at which the program was being executed before the error was detected by a detector;
reading the program, the initial value of the variable data, and the constant data from the non-volatile storage when an error is detected in one of the variable data and the program;
writing the read program, initial value of the variable data, and constant data into the volatile storage; and
executing the program written into the volatile storage from a beginning of the program.

9. The program processing method according to claim 8, further comprising detecting an error after a response to a processing request sent from outside has been completed.

10. The program processing method according to claim 8, further comprising detecting an error by calculating a checksum from each of the program, the variable data, and the constant data stored in the volatile storage.

11. The program processing method according to claim 8, further comprising:
storing a parity code in the volatile storage along with each of the program, the variable data, and the constant data, and
detecting an error by checking states of the parity codes read along with the program, the variable data, and the constant data from the volatile storage.

12. The program processing method according to claim 8, further comprising storing a record of a detected error in the non-volatile storage.

13. The program processing method according to claim 8, further comprising generating an initialization request interrupt each time a predetermined period of time has elapsed, and
executing the program written into the volatile storage from the beginning when the initialization request interrupt is generated.

14. The program processing method according to claim 13, further comprising resetting time counting before the predetermined period of time has elapsed when the program written into the volatile storage is being executed.

15. A program processing controller comprising:
a detector detecting a bit flip in a program, a variable data whose value changes in accordance with execution of the program, and a constant data whose value is constant regardless of the execution of the program,
a constant recovery unit, when the detector detects an error in the constant data, reading the constant data from a non-volatile storage, writing the read constant data into a volatile storage, and then continuing the execution of the program from a point at which the program was being executed before the detector detected the error, and
a restart unit, when the detector detects an error in one of the variable data and the program, reading the program, the initial value of the variable data, and the constant data from the non-volatile storage, writing the read program, initial value of the variable data, and constant data into the volatile storage, and then executing the program written into the volatile storage from a beginning of the program.

* * * * *